United States Patent [19]

Taylor

[11] Patent Number: 4,696,194

[45] Date of Patent: Sep. 29, 1987

[54] FLUID FLOW MEASUREMENT

[75] Inventor: James C. Taylor, Colchester, England

[73] Assignee: Taurus Controls Limited, Colchester, England

[21] Appl. No.: 831,938

[22] Filed: Feb. 20, 1986

[51] Int. Cl.$^4$ .............................................. G01F 1/46
[52] U.S. Cl. ................................................. 73/861.66
[58] Field of Search ..................................... 73/861.66

[56] References Cited

U.S. PATENT DOCUMENTS

| 1,087,988 | 2/1914 | Sheldon | 73/861.66 |
| 3,803,921 | 4/1974 | Dieterich | 73/861.66 |
| 4,030,358 | 6/1977 | Noll | 73/861.66 |
| 4,592,239 | 6/1986 | Cutler | 73/861.66 |

Primary Examiner—Herbert Goldstein
Attorney, Agent, or Firm—Varnum, Riddering, Schmidt & Howlett

[57] ABSTRACT

A sensing probe 10 for use in determining fluid flow rates along a duct 11 comprises a probe pipe 12 mounted within a wall of the duct 11 to extend thereacross. A plurality of total pressure orifices 17 are provided through the probe wall, to face fluid flow, and a single static pressure opening 18 is provided on the downstream side of the probe. An averaging tube 19 is mounted within the pipe and has two openings 20 suitably disposed with respect to the duct axis so that the pressure within the averaging tube closely approximates to the average total pressure for the flow rate determination. The static pressure orifice 18 communicates with a further tube 23 within the pipe, to allow sensing of a pressure directly related to the actual static pressure.

10 Claims, 5 Drawing Figures

FLUID FLOW MEASUREMENT

BACKGROUND TO THE INVENTION (a) Field of the Invention

This invention relates to a probe for use in determining fluid flow rates in a duct, by sensing both total pressure and static pressure for the fluid flow so that the fluid flow rate may be deduced from the differential pressure between the total and static pressures obtained. The invention further relates to apparatus for determining fluid flow rates in a duct, which apparatus includes such a fluid flow sensing probe.

(b) Description of the Prior Art

It is well known to use a Pitot head, to determine fluid flow rates. A typical Pitot head has two probes, one (the impact probe) facing the fluid flow so as to permit measurement of the total pressure of the fluid flow and the other (the static probe) facing away from the fluid flow (i.e. facing the direction of fluid flow), so as to permit measurement of the static pressure of the fluid flow. Then, determining the difference between the total and static pressures enables an assessment of the fluid flow rate to be obtained.

If the flow rate of fluid within a duct is to be determined, it has long been established that a single Pitot head mounted within the duct is not sufficient to enable an accurate assessment of the fluid flow rate to be made. This is on account of the fact that the 'velocity flow profile' across the duct is likely to be irregular; and in any event the velocity flow profile is unlikely even to be symmetrical about the duct axis unless the flow profile has become fully developed after a relatively long unimpeded straight run. Consequently, in most typical industrial installations, it is necessary to employ considerably more complex equipment than a simple Pitot head, when the flow rate along a duct must be determined.

In order to overcome the problem of an irregular velocity flow profile within a duct, a single Pitot head may be traversed across the duct carrying the fluid, and differential pressure readings taken at closely-spaced intervals during the Pitot head traverse. A suitable averaging computation may then be performed on the plurality of differential pressure readings so obtained. An alternative is to provide a plurality of individual Pitot heads mounted at closely spaced intervals across the duct, and again to perform a suitable computation on the plurality of differential pressure readings obtained therefrom. In either case, the equipment involved inevitably is complex and expensive, and the determination of the fluid flow rate is a tedious and time consuming process, involving lengthy calculations.

In an attempt to overcome the above problems, there have been proposals for a so-called self-averaging Pitot-type probe, where the total pressure is determined by providing a modified form of impact probe in the form of a pipe extending across the duct in which the fluid flow rate is to be determined, the pipe having a plurality of total pressure openings along its length and there being a total pressure measuring tube mounted within the pipe which tube has a single total pressure opening disposed substantially on the duct axis, whereby a single total pressure reading is obtained from the tube. An example of such a pressure sensing probe is to be found in U.S. Pat. No. 3,581,565 (Peter D. Dieterich).

Though probes similar to those described in U.S. Pat. No. 3,581,565 have been found to perform adequately when the fluid flow along a duct has a velocity flow profile which is substantially symmetrical about the duct axis, nevertheless it has been found that errors occur when the flow profile is irregular - and the more irregular the profile, the greater the errors. It has been established by the present inventor that this is on account of the fact that because the total pressure openings in the pipe are across the width of the duct and the flow profile is irregular across the duct, different total pressures are set up at each total pressure opening, so leading to fluid flow currents within the pipe, from one total pressure opening to another. The averaging function of the single total pressure sensing tube consequently is only incompletely established, by virtue of the existence of those currents.

OBJECTS OF THE INVENTION

It is a principal object of this invention to provide a sensing probe for use in determining fluid flow rates along a duct, which sensing probe is able still to perform an effective averaging function even when the velocity flow profile across the duct is irregular.

A further object of the invention is to provide a sensing probe which is relatively simple to manufacture and install in a duct, and yet which may permit an accurate assessment of the total fluid flow rate along the duct, even when the flow rate is being determined in a region having an irregular flow profile, such as following a bend in the duct.

Yet another object of the invention is to provide a sensing probe which is reliable in operation and having pressure sensing openings which are at least to some extent protected against blocking by foreign matter in the fluid flow being sensed.

Another object of the present invention is to provide apparatus for determining fluid flow rates along a duct, which apparatus includes an averaging probe in combination with apparatus to sense the differential pressure between the sensed total and static pressures obtained therefrom so as to yield the flow rate along the duct.

SUMMARY OF THE INVENTION

In accordance with these an other objects, this invention provides a sensing probe for use in determining fluid flow rates along a duct, which sensing probe comprises:

a probe pipe adapted for mounting within said duct so as to extend thereacross with one end of said pipe closed and the other end of said pipe communicating with the exterior of said duct;

a plurality of first orifices extending through the wall of said probe pipe and arranged along the length of said pipe;

at least one second orifice extending through the wall of said pipe at a position spaced by at least 90° of arc from said first orifices;

averaging tube means mounted within said pipe and having at least two spaced-apart openings giving communication between the interior of said pipe and the interior of said tube means, the openings being positioned to each side of the duct axis when the probe is mounted therewithin;

first pressure connector means disposed externally of said duct, said averaging tube means leading thereto;

a static pressure tube also mounted within said probe pipe and being connected directly to said second orifice; and second pressure connector means disposed externally of said duct, said static pressure tube leading thereto;

whereby when said probe pipe is mounted n said duct with said first orifices facing fluid flow in the duct and said second orifice downstream of said first orifices, the fluid flow rate can be deduced from the difference between the averaged total pressure appearing at said first pressure connector means and the pressure appearing at said second pressure connector means.

In the arrangement of this invention, an optimised self-averaging function is obtained for the total pressure reading even for a case where there is an irregular velocity flow profile in the duct. This is as a result of the improved averaging function obtained by having at least two spaced openings in the averaging tube means disposed to each side of the duct axis, so minimising the effects of an irregular pressure distribution at the first orifices of the probe pipe.

BRIEF DESCRIPTION OF THE DRAWINGS

In order that this invention may better be understood, it will now be described in greater detail and two specific embodiments thereof given, reference being made the accompanying drawings, in which.

DESCRIPTION OF THE PREFERRED EMBODIMENTS

Figure 1:
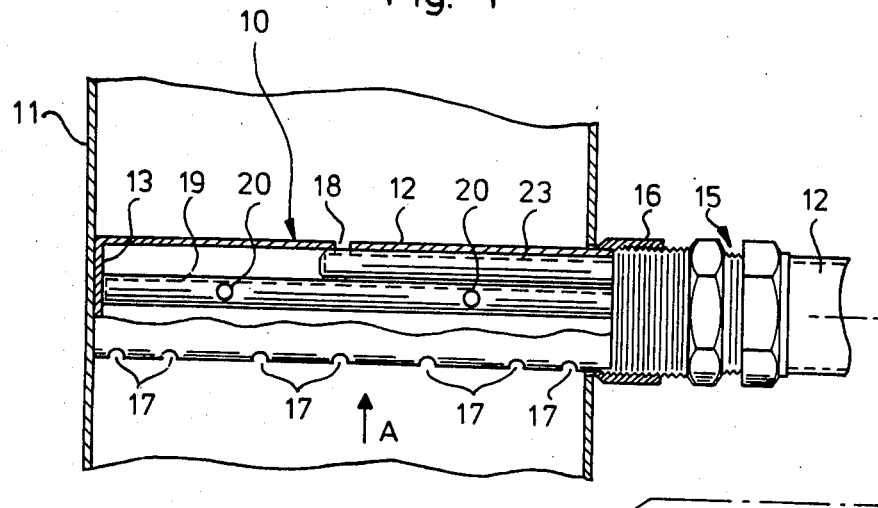
FIG. 1 is a cross-sectional view through the major part of a sensing probe of this invention, as positioned within a duct but with the connector block separated therefrom.

It will be appreciated that in this invention an improved total pressure averaging function is obtained as compared to the prior art self-averaging Pitot tube sensing probes, by virtue of the particular configuration employed for first orifices in the probe pipe, and the opening in the averaging tube means. This averaging function may yet further be enhanced, by carefully positioning the first orifices and the openings in the averaging tube means to optimise the averaging effect. Preferably, therefore, there are at least two first orifices to each side of the duct axis, arranged symmetrically with respect thereto, the total number of orifices depending upon the overall physical size of the duct. Thus, with a larger duct three first orifices to each side of the duct axis may be employed, and with very large ducts it may be advantageous to use as many as five first orifices to each side. Furthermore, the pressure sensing may be further improved by providing a central first orifice, to lie essentially on the duct axis, when the probe pipe is installed therein.

No matter how many first orifices are provided, it is preferred that the relative spacing of the orifices from the duct wall follows a logarithmic progression. Thus, the ratio $Y_n/D$, where $Y_n$ is the distance of the nth orifice from the duct wall and D is the duct diameter, should follow a logarithmic law, for successive orifices from the duct wall.

The spaced openings in the averaging tube means preferably are disposed essentially symmetrically to each side of the duct axis, and the spacing therebetween advantageously is substantially equal to one half of the duct diameter—that is, in the case of a circular duct, equal to the duct radius. It will be appreciated that where the duct is not circular (for instance, of square or rectangular cross-section), the probe pipe still should extend from one wall of the duct to the linearly opposed wall; the dimension along that line across the duct is equivalent to the duct diameter and references herein to 'diameter' when referring to the duct should be construed accordingly.

Most preferably, the openings in the averaging tube means are arranged to be directed transversely of the duct in which the probe is mounted; that is to say, the openings should be disposed so as to face in directions substantially at 90° to the direction which said first orifices face through the probe pipe wall. This tends to minimise any adverse effects which could otherwise be caused due to fluid flow into the first orifices and then along the probe pipe due to an irregular velocity flow profile. A further advantage of this configuration is that even if some foreign matter should enter the interior of the tube on passing through one or more of the first orifices, the likelihood of that foreign matter blocking the openings in the averaging tube means is much reduced.

Conveniently, the averaging tube means comprises a single tube mounted substantially co-axially within the probe pipe, the openings therewithin being suitably disposed along the length of that tube. However, it would be possible for the averaging tube means to comprise a plurality of individual tubes, one associated with each pressure sensing opening and secured within the probe pipe to have its opening disposed at the required position within the probe pipe. Thus, typically two such tubes could be provided, both tubes being connected to the first pressure connector disposed externally of the duct.

Whatever the form of the tube means, each opening into the associated tube may be in the form of a throughbore extending wholly across the tube, and so as in effect to consist of two diametrically opposed openings through the tube wall, the axis of the these two openings being normal to the plane containing the axes of all the first orifices.

The pressure sensed at the second orifice will depend upon the positioning of the second orifice with respect to the first orifices, but true static pressure may be calculated from the sensed pressure from a knowledge of the configuration employed, or from empirical tests. Preferably, the second orifice is diametrically opposed from the line of first orifices, so that in use when the first orifices face directly upstream, the second orifice faces directly downstream, though adequate results may be obtained so long as the second orifice is downstream of the first orifices, so long as appropriate corrections are applied to the sensed pressure, appearing at the second pressure connector emans.

The static pressure tube preferably has an opening in its side wall which opening is in register with said second orifice in the probe pipe, the tube being affixed to the inner wall of the probe pipe around the registering second orifice and opening, and being closed at its end within the probe pipe. It will be appreciated that this construction, in association with the use of a single averaging tube having two spaced-apart openings, is relatively simple to manufacture whilst still permitting high-accuracy flow determination to take place.

Referring now to the drawings, and FIGS. 1 to 4 in particular, there is shown an actual embodiment of a specific example of self-averaging pressure sensing Pitot probe assembly 10 of this invention. The sensing probe 10 is shown mounted within a circular duct 11 so as to extend diametrically thereacross, with connections for differential pressure sensing equipment disposed externally of the duct. The probe 10 must be specifically adapted for use with the duct 11, in that the precise position of certain orifices and holes in the probe must exactly suit the diameter of the duct. The probe 10 comprises a probe pipe 12 of circular cross-section, closed at end 13 and having a connector block 14 (FIG. 2) mounted on the other end of the pipe, which when in use is eternal of the duct 11. A screw-threaded clamping arrangement 15 is provided on the probe pipe 12 and is adapted for interengagement with a screw-threaded boss 16 provided in the wall of the duct 11, at a position where the fluid flow rate is to be sensed.

Seven total pressure sensing orifices 17 are provided through the wall of the pipe at predetermined positions along a straight line extending parallel to axis of the probe pipe 12; one of these orifices 17 is disposed on the duct axis, and the other six are disposed symmetrically three to each side of the central orifice. A further orifice 18 is provided through the probe pipe wall position diametrically opposed to the central orifice 17, which further orifice serves to sense a pressure directly related by a simple factor to true static pressure when the probe is in use. Mounted in the connector block 14 so as to extend coaxially within the probe pipe 12 is an averaging tube 19, closed at its end adjacent the end 13 of the probe pipe 12. The averaging tube has two openings 20 to give communication between the interior of the probe pipe 12 and the interior of the averaging tube 19, each opening comprising a hole bored diametrically wholly through the averaging tube 19, so as to give in effect two openings diametrically opposed with respect to the averaging tube itself. When the probe pipe is positioned in the duct, these openings 20 should be disposed with respect to the duct symmetrically one to each side of the duct axis and with the spacing therebetween substantially equal to the radius of the duct inner wall. Moreover, the common axis of the openings should be substantially at 90° to the plane containing the axes of the orifices 17 and the axis of orifice 18. Within the connector block 14, the averaging tube 19 communicates with a port 21 in turn leading to a first pressure connector 22.

Also mounted on the connector block 14 is a static pressure tube 23 to extend within the probe pipe 12. The tube 23 is secured to the inner wall of the pipe 12 around the static pressure sensing orifice 18 therein so that the opening in the tube is in register with the orifice 18. In this way, there is direct communication from outside to the probe pipe 12 through orifice 18 to the interior of the tube 23, but not to the interior of the pipe 12. The static pressure tube 23 and is in communication with a port 24 in connector block 14, leading to a second pressure connector 25.

Figure 2:
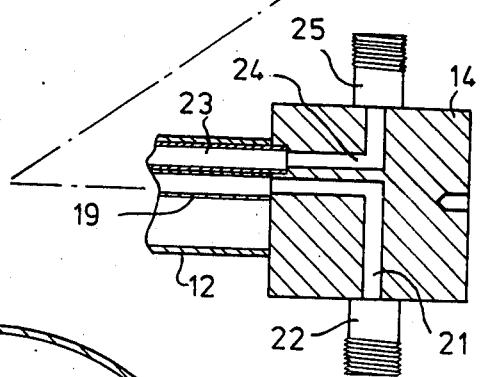
FIG. 2 is a cross-sectional view of the connector block which forms a part of the pressure sensing probe illustrated in FIG. 1.
Figure 3:
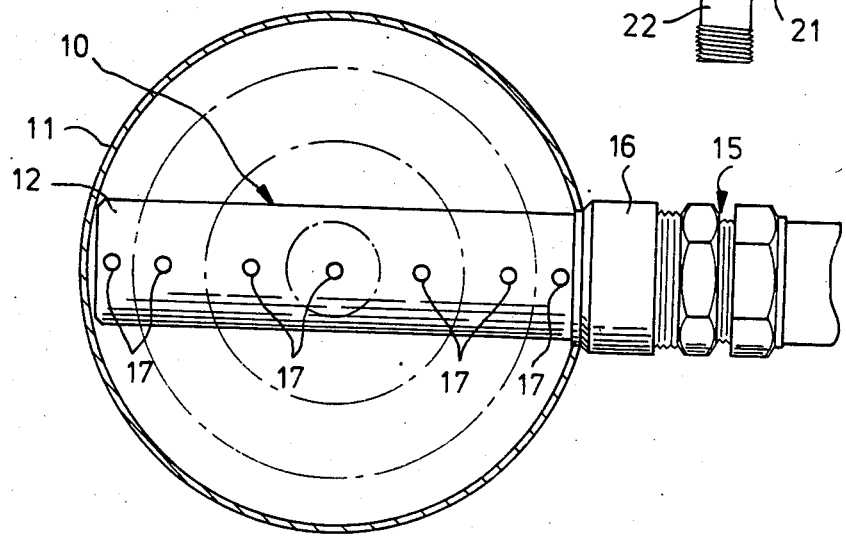
FIG. 3 is a view on the presure sensing probe as mounted within a duct, taken in the direction of arrow 'A' marked on FIG. 1.

Further details of the arrangement described above will now be given, referring to FIG. 4 in which like parts with those of FIGS. 1 to 3 are given like reference characters.

Figure 4:
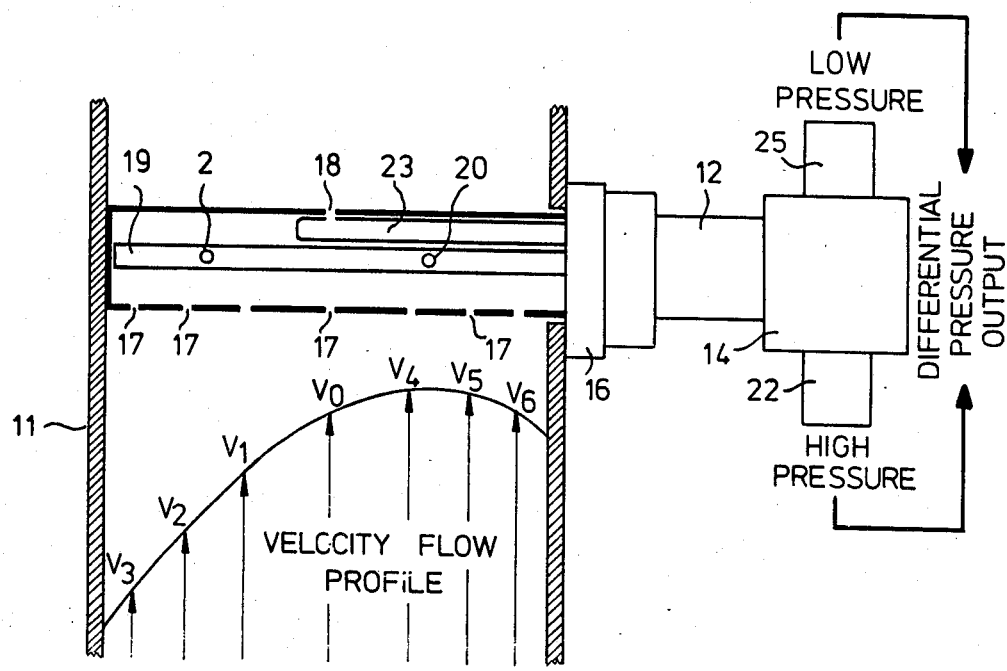
FIG. 4 is a diagrammatic view showing a velocity flow profile within a duct and the positioning of the flow sensing probe of this invention within the duct.

It is an aim of this invention to provide means yielding an averaged total pressure head which is sufficiently accurate notwithstanding an irregular flow profile in the duct to permit adequate flow rate determination. In FIG. 4, there is shown such a velocity flow profile where the flow rate on one side of the duct 11 is very much lower than the flow rate towards the other side of that duct. The actual flow rate can be assessed by integrating the area below the flow profile curve; the relative disposition of the orifices 17 in the probe pipe 12 and the openings 20 in the averaging tube 19 is, in the present invention, optimised to allow an adequate assessment of the flow. One orifice 17 is provided centrally on the axis of the duct 11, and to each side of that central orifice are three further orifices; the spacing of those three orifices is selected having regard to the overall parameters of the system, with the relative spacing between the orifices following a logarithmic progression, as mentioned hereinbefore. The two openings 20 in the averaging tube 19 mounted within the probe pipe 12 should be disposed with the spacing therebetween substantially equal to the inner radius of the duct 11 itself—that is to say, each opening 20 lies halfway between the inside wall of the duct and the axis thereof.

In order to use the probe pipe 12, it is passed through the boss 16 provided in the duct 11 until end 13 of the probe pipe 12 contacts the opposite inside wall of the duct 11; this serves as a reference point to ensure the central orifice 17 lies on the duct axis. The mounting arrangement 15 is then tightened within the boss 16 with the probe pipe 12 disposed so that orifices 17 face the fluid flow within the duct and with orifice 18 facing downstream, in the direction of fluid flow. The orifices 17 thus serve to sense total pressure and orifice 18 to sense a pressure directly related by a constant to static pressure. A suitable differential pressure sensing instrument is connected to the two connectors 22 and 25, respectively to operate on the high and low pressure outputs from the probe and so to permit an assessment of the actual flow rate in the duct to be obtained.

Figure 5:
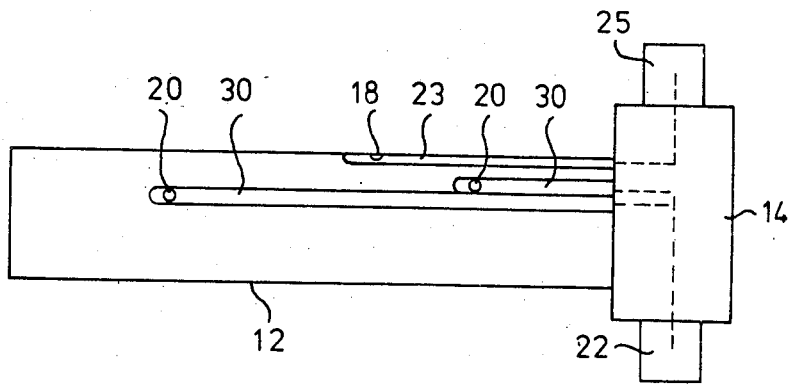
FIG. 5 diagrammatically shows an alternative configuration for the pressure sensing probe.

FIG. 5 shows diagrammatically an alternative form for the internal arrangement within the probe pipe 12, the pressure sensing probe in other respects corresponding to that illustrated in FIGS. 1 to 3. In the probe pipe of FIG. 5, two separate internal averaging tubes 30 are provided, to replace the single tube 20 of the arrangement of FIGS. 1 to 3. The averaging tubes are interconnected within the connector block 14 and both lead to the first pressure connector 22, but within the main part of the probe pipe 12, the two tubes 30 are separate. Each tube may be open at its free end, or (as shown) may there be closed and have one diametral hole therethrough, at the required position. Such an arrangement may be advantageous from the manufacturing point of view in that the two averaging tubes may separately be manufactured and then assembled within the probe pipe 12. In a further alternative arrangement (not illustrated) an opening may be provided within the connector block 14 to give direct communication between the probe pipe interior and the duct 21. This may assist the overall balancing of the averaged pressure within the probe pipe 12. Yet another possibility is to provide more than one static pressure sensing orifices arranged along the length of the pipe, or for a high velocity application to sense static pressure at the duct wall, where the pipe 12 is mounted thereto, for example by providing a duct in boss 16 opening radially into the duct and communicating with the second orifice in the pipe 12, which second orifice is provided at a position on the pipe which is located within that boss.

What I claim is:

1. A sensing probe for use in determining fluid flow rates along a duct, which sensing probe comprises:
   a probe pipe adapted for mounting within said duct so as to extend thereacross with one end of said pipe closed and the other end of said pipe communicating with the exterior of said duct;
   a plurality of first orifices extending through the wall of said probe pipe and arranged along a length of said pipe;
   at least one second orifice extending through the wall of said pipe at a position spaced by at least 90° of arc from said first orifices;
   averaging tube means comprising a single tube mounted within and extending along said pipe and having at least two spaced-apart openings giving communication between the interior of said pipe and the interior of said tube means, each opening consisting of a bore extending wholly across said single tube and the openings being positioned to each side of the duct axis when the probe is mounted therewithin;
   first pressure connector means disposed externally of said duct, said averaging tube means lending thereto;
   a static pressure tube also mounted within said probe pipe and being connected directly to said second orifice; and
   second pressure connector means disposed externally of said duct, said static pressure tube leading thereto;
   whereby when said probe pipe is mounted in said duct with said first orifices facing fluid flow in the duct and said second orifice downstream of said first orifices, the fluid flow rate can be deduced from the difference between the averaged total pressure appearing at said first pressure connector means and the pressure appearing at said second pressure connector means.

2. A sensing probe as claimed in claim 1, in which one of said first orifices lies on the duct axis and there is a like number of further first orifices disposed substantially symmetrically to each side of said one first orifice.

3. A sensing probe as claimed in claim 2, in which the relative spacing between successive first orifices from the side wall of the duct towards the centre of the duct follows and essentially logarithmic progression.

4. A sensing probe as claimed in claim 3, in which said openings of said averaging tube means are disposed symmetrically to each side of the duct axis with a spacing substantially equal to the radius of the duct.

5. A sensing probe as claimed in claim 1, in which said openings in said averaging tube means are disposed with their axes substantially at 90° to the duct axis.

6. A sensing probe for use in determining fluid flow rates along a duct, which sensing probe comprises:
   a probe pipe adapted for mounting within said duct so as to extend thereacross with one end of said pipe closed and the other end of said pipe communicating with the exterior of said duct;
   a plurality of first orifices extending through the wall of said probe pipe and arranged along a length of said pipe, one of said first orifices lying on the duct axis and there being a like number of further first orifices disposed substantially symmetrically to each side of said one first orifice, the relative spacing between successive first orifices from the side wall of the duct towards the center of the duct following an essentially logarithmic progression;
   at least one second orifice extending through the wall of said pipe at a position spaced by at least 90° of arc from said first orifices;
   averaging tube means mounted within said pipe and having at least two spaced-apart openings disposed symmetrically to each side of the duct axis and with a spacing substantially equal to the radius of the duct, the openings giving communication between the interior of said pipe and the interior of said tube means;
   first pressure connector means disposed externally of said duct, said averaging tube means leading thereto;
   a static pressure tube also mounted within said probe pipe and being connected directly to said second orifice;
   second pressure connector means disposed externally of said duct, said static pressure tube leading thereto;
   whereby when said probe pipe is mounted in said duct with said first orifices facing fluid flow in the duct and said second orifice downstream of said first orifices, the fluid flow rate can be deduced from the difference between the averaged total pressure appearing at said first pressure connector means and the pressure appearing at said second pressure connector means.

7. A sensing probe as claimed in claim 6, in which said averaging tube means comprises a plurality of tubes each extending along said probe pipe, and each said tube having a single pressure-sensing opening.

8. A sensing probe as claimed in claim 6, in which said static pressure tube has an opening in its side wall which said opening is in register with said second orifice in the probe pipe, said static pressure tube being affixed to the inner wall of the probe pipe around the registering opening and second orifice.

9. A sensing probe as claimed in claim 6, in which said openings in said averaging tube means are disposed with their axes substantially at 90° to the duct axis.

10. Flow rate determining apparatus comprising:
    a probe pipe adapted for mounting within a duct so as to extend thereacross with one end of said pipe closed and the other end of said pipe communicating with the exterior of said duct;
    a plurality of first orifices extending through the wall of said pipe and arranged in a line parallel to the pipe axis, there being one first orifice lying on the duct axis and a like number of further first orifices disposed substantially symmetrically to each side of said one first orifice, the relative spacing between the duct side wall and successive first orifices following an essentially logarithmic progression;
    at least one second orifice extending through the wall of said pipe at a position spaced by at least 90° of arc from said line of first orifices;
    an averaging tube mounted within said pipe and having two spaced-apart openings giving communication between the interior of said pipe and the interior of said tube, the openings being positioned substantially symmetrically to each side of the duct axis when the probe is mounted therewithin with the spacing between said openings being substantially equal to the duct radius;

first pressure connector means disposed externally of said duct, said averaging tube leading thereto;

a static pressure tube also mounted within said probe pipe and being connected directly to said second orifice;

second pressure connector means disposed externally of said duct, said static pressure tube leading thereto; and differential pressure sensing means connected between said first and second pressure connector means;

whereby when said probe pipe is mounted in said duct with said first orifices facing upstream, said differential pressure sensing means gives an indication of the fluid flow rate in said duct.

* * * * *